United States Patent
Qureshi et al.

(10) Patent No.: US 6,792,520 B2
(45) Date of Patent: Sep. 14, 2004

(54) SYSTEM AND METHOD FOR USING A USING VENDOR-LONG DESCRIPTOR IN ACPI FOR THE CHIPSET REGISTERS

(75) Inventors: Shiraz A. Qureshi, Roseville, CA (US); Martin O. Nicholes, Antelope, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 253 days.

(21) Appl. No.: 10/212,691

(22) Filed: Aug. 7, 2002

(65) Prior Publication Data

US 2004/0030854 A1 Feb. 12, 2004

(51) Int. Cl.⁷ .............................................. G06F 12/00
(52) U.S. Cl. .................. 711/170; 711/152; 711/156; 711/163; 711/215; 710/3; 710/8; 713/1; 713/100
(58) Field of Search ............................ 710/3, 8, 23, 26, 710/56; 711/151, 152, 156, 158, 163, 170, 215, 217, 221; 713/1, 100; 709/321, 327

(56) References Cited

U.S. PATENT DOCUMENTS

| 5,897,658 A | * | 4/1999 | Eskesen et al. ............. 711/152 |
| 6,581,148 B1 | * | 6/2003 | Sadashivaiah et al. ...... 711/170 |
| 6,701,421 B1 | * | 3/2004 | Elnozahy et al. ........... 711/170 |
| 2002/0059473 A1 | | 5/2002 | Oshins et al. |

OTHER PUBLICATIONS

"Dynamic Network Reconfiguration Support for Mobile Computers," Inouye et al, MOBICOM 97, Budapest Hungary, 1997, ACM.*

* cited by examiner

Primary Examiner—Donald Sparks
Assistant Examiner—Christian P. Chace

(57) ABSTRACT

A system and method for using memory mapped I/O (MMIO) to manage system devices is provided. A parent device in the ACPI namespace uses (MMIO) to identify the memory addresses of its children devices. An existing, but unused, construct of ACPI is used to pass the MMIO information through the operating system (OS) to the device drivers, enabling memory to be reserved by a device, and also remain hidden to the OS. The vendor defined resource data type for long information, also known as the "vendor-long" descriptor, is used to pass the appropriate information through the OS.

16 Claims, 4 Drawing Sheets

SYSTEM AND METHOD FOR USING A USING VENDOR-LONG DESCRIPTOR IN ACPI FOR THE CHIPSET REGISTERS

BACKGROUND

Advanced Configuration and Power Interface (ACPI) is a specification that makes hardware status information available to an operating system in computers, including laptops, desktop, servers, etc. More information about ACPI may be found in the 500 page "Advanced Configuration and Power Interface Specification," Revision 2.0a, Mar. 31, 2002, cooperatively defined by Compaq Computer Corporation, Intel Corporation, Microsoft Corporation, Phoenix Technologies Ltd., and Toshiba Corporation. The ACPI specification was developed to establish industry common interfaces enabling robust operating system (OS)-directed motherboard device configuration and power management of both devices and entire systems. ACPI is the key element in operating system-directed configuration and power management (OSPM).

ACPI is used in personal computers (PCs) running a variety of operating systems, such as Windows™, available from Microsoft® Corporation, Linux, available as open source form a variety of vendors, and HP-UX, available from Hewlett-Packard Company. ACPI also allows hardware resources to be manipulated. For example, ACPI assists in power management by allowing a computer system's peripherals to be powered on and off for improved power management. ACPI also allows the computer system to be turned on and off by external devices. For example, the touch of a mouse or the press of a key may wake up the computer system using ACPI.

Traditionally ACPI has been difficult to work with for a variety of reasons. First, ACPI is not written in the native assembly language of any computer system platform. Instead, ACPI has its own source and machine languages, i.e., ACPI Source Language (ASL) and ACPI Machine Language (AML), respectively. Because of its highly specialized use, there are relatively few ASL programmers; ASL has relatively few constructs because of its limited use. Furthermore, ACPI code is conventionally monolithic in its design. Consequently, this makes it difficult to port the ACPI code to other platforms or even to different configurations of the same platform. Thus, new ASL code needs to be written to work with newly-engineered platforms. The limited number of ASL programmers makes writing new code all the more problematic and costly.

ACPI is composed of both static and interpretable tables. At boot-up time, the system firmware (typically the BIOS, or Basic Input/Output System) constructs the static tables, which are consumed by the operating system. The interpretable tables are composed of AML, which is compiled and then merged into the system firmware. The operating system reads the AML from the interpretable tables and executes the architected interfaces, using an ACPI interpreter. In this fashion, the operating system manipulates hardware resources. Because the interpretable tables are merged into the system firmware, this conventional method lacks flexibility, and scalability, and requires considerable time to re-program to accommodate divergent system configurations.

For example, conventionally, ASL developers write ACPI code to specify a particular configuration of a platform or its variance. Unfortunately, if even a minor hardware change is performed, the design has to be modified. This requires that new AML code be written and new tables be merged into the system firmware. Thus, the conventional design is not portable or re-usable.

Furthermore, ACPI has conventionally required that a different system firmware ROM (Read Only Memory) or BIOS be used if there is a variance of the platform or if it supports more than one ACPI-aware OS system, where the OS systems have mutually exclusive ACPI requirements. A different system firmware ROM also had to be used if the same system is to support multiple operating systems. For instance, current art in personal computers uses the IA-32 instruction set. ACPI was primarily used by the Microsoft® family of operating systems, especially in systems with the IA-32 instruction set.

ACPI has been accepted by the various operating systems as the standard interface. A new instruction set architecture, IA-64, is being developed, but its advantages cannot be fully utilized with legacy ACPI code, or methods. The new Itanium® Processor Family, available from Intel® Corporation, uses the IA-64 instruction set. The ASL for each new processor in this family will need to be uniquely rewritten if current practices are utilized. Further, if multiple operating systems must run on a given processor, the ASL would need to be unique for each OS, as well.

The ACPI namespace is a hierarchical tree structure in OS-controlled memory that contains named objects. These objects may be data objects, control method objects, bus/device package objects, and so on. The OS dynamically changes the contents of the namespace at run-time by loading and/or unloading definition blocks from the ACPI Tables that reside in the ACPI BIOS. All the information in the ACPI namespace comes from the differentiated system description table (DSDT), which contains the differentiated definition block, and one or more other definition blocks. In the current art, an OEM (original equipment manufacturer) must supply a DSDT to an ACPI-compatible OS, which supplies the implementation and configuration information about the base system. The OS always inserts the DSDT information into the ACPI namespace at system boot time and never removes it.

Another ACPI construct is the secondary system description table (SSDT). SSDTs are a continuation of the DSDT. Multiple SSDTs can be used as part of a platform description. After the DSDT is loaded into the ACPI Namespace, each secondary description table with a unique OEM Table ID is loaded. This allows the OEM to provide the base support in one table, while adding smaller system options in other tables. Additional tables can only add data; they cannot overwrite data from previous tables.

Computer systems of the prior art, which use IA-32 and ACPI, typically use I/O port address space to manage the register memory maps for the various I/O devices in the computer system. While this method can be used for IA-64, it has serious drawbacks given that a server can have 500 or more devices and resources.

SUMMARY

A system and method for using memory mapped I/O (MMIO) to manage system devices is provided. A parent device in the ACPI namespace, for instance, a local bus adapter, uses (MMIO) to identify the memory addresses of its children devices. An existing, but unused, construct of ACPI is used to pass the MMIO information through the operating system (OS) to the device drivers, enabling memory to be reserved by a device, and also remain hidden to the OS. The vendor defined resource data type for long information, also known as the "vendor-long" descriptor, is used to pass the appropriate information through the OS. This method enables the memory information to be passed to the OS without the risk that the OS will mistake the addresses as being available, and reassigning them in error.

DESCRIPTION OF THE DRAWINGS

The detailed description will refer to the following drawings, wherein like numerals refer to like elements, and wherein.

DETAILED DESCRIPTION

ACPI is an IA-32 instruction set concept that is still used for the new IA-64 instruction set. ACPI is a way for abstracting hardware manipulation and configuration data to define the configuration of the hardware for operating system (OS) and firmware interaction. ACPI is a specification industry standard. Currently, the major three commercial personal computer (PC) operating systems, i.e., Linux, HP/UX and Windows™, use ACPI in IA-32 space and will run using ACPI in the new IA-64 space. Upon system boot, the firmware powers up and determines the system configuration. The system is initialized, if it needs to be, and then the operation is handed over to the OS, i.e., boots up the OS. When a system is booted up, it must have knowledge of the different platform configurations. ACPI is a specification for the hardware configuration that has interface objects and a namespace in order to define the divergent platform configurations.

The ACPI namespace describes the hierarchy of a computer system in a logical way. For example, when the OS consumes the namespace, it gets a picture of what the hardware looks like underneath. Thus, if the OS needs to get a resource for a given hardware component, or if it needs to know how to access a component, it looks to the namespace. For example, if the OS needs to put the machine to sleep, there is an object that will identify how to put a device to sleep. The OS uses the interfaces or objects defined in the namespace to manipulate the hardware. This is the function of ACPI.

The present system and method takes advantage of the IA-64 instruction set architecture rather than merely using legacy code left over from IA-32 platforms. Specifically, today's computer systems can have well over 500 devices and resources to control. Traditional use of I/O port space for defining resource addresses is insufficient. The present system and method utilizes an existing construct of ACPI, the vendor-long field, to pass appropriate memory mapped I/O information corresponding to requested resources.

Figure 1:
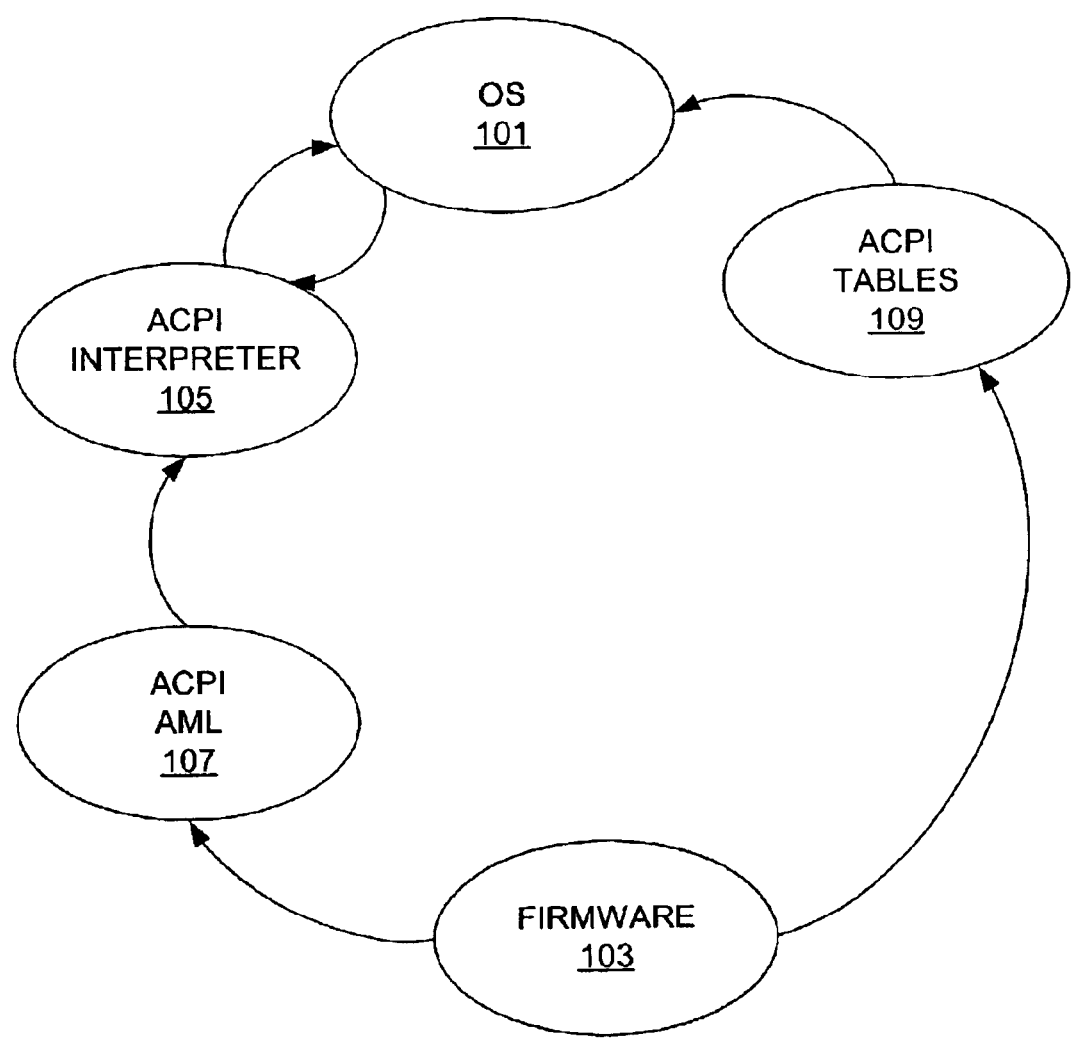
FIG. 1 shows a block diagram depicting the interaction between the OS and the ACPI interpreter and ACPI tables.

Referring now to the drawings, and in particular to FIG. 1, there is shown a block diagram depicting the interaction between the OS and the ACPI interpreter and ACPI tables. During normal system operation, the OS 101 needs to access or operate some hardware function. To do this, it must have information about how the hardware operates. Upon boot-up, the system firmware 103 creates the ACPI namespace, and populates ACPI tables 109 with the system component information. When the OS 101 attempts to access or operate the hardware, it runs ACPI AML code 107 through the ACPI interpreter 105 to retrieve the system information. In systems of the prior art, the AML would be hard coded for a specific operating system.

When the system firmware 103 is booting up, it prepares its corresponding AML 107. It also sets up architected static tables 109. When the OS takes control, it automatically knows how to find the ACPI tables 109, retrieves them, and consumes them. For a given boot, the static ACPI tables 109 will stay as they are, without changing.

Figure 2:
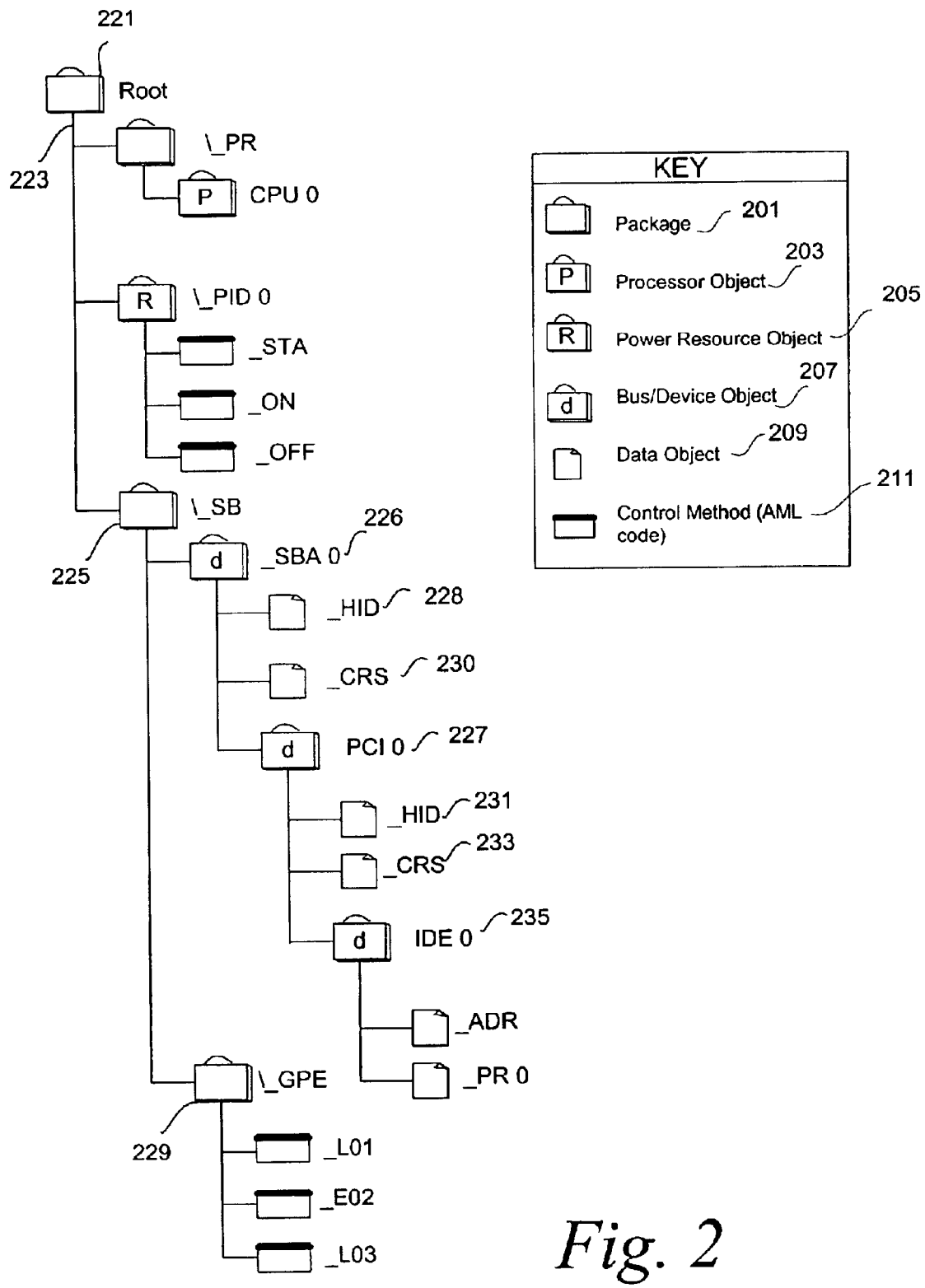
FIG. 2 shows an exemplary and simplified ACPI namespace definition.

The ACPI tables define the namespace of the loaded system components. Referring now to FIG. 2, there is shown an exemplary and simplified ACPI namespace definition. The namespace may include packages 201, processor objects 203, power resource objects 205, bus/device objects 207, data objects 209 and control methods, or AML code, 211. The Root (package) 221 has a corresponding processor tree, \_PR, 223 and a corresponding system bus tree, \_SB, 225. The system bus tree has a corresponding System bus adapter, _SBA0 226, tree, as well.

The PCI bus (bus/device object), PCI0, 227 is a child of _SBA0 226, and has a corresponding bus/device tree. The general purpose event package, \_GPE, 229 is a child of the Root 221. In this exemplary namespace, the system bus adapter _SBA0 226 and the PCI bus PCI0 227 both have device identifiers, _HID, 231 and 228; and current resource status data objects, _CRS, 233 and 230. The PCI bus 227 also has an IDE0 device bus/device object 235.

Figure 3:
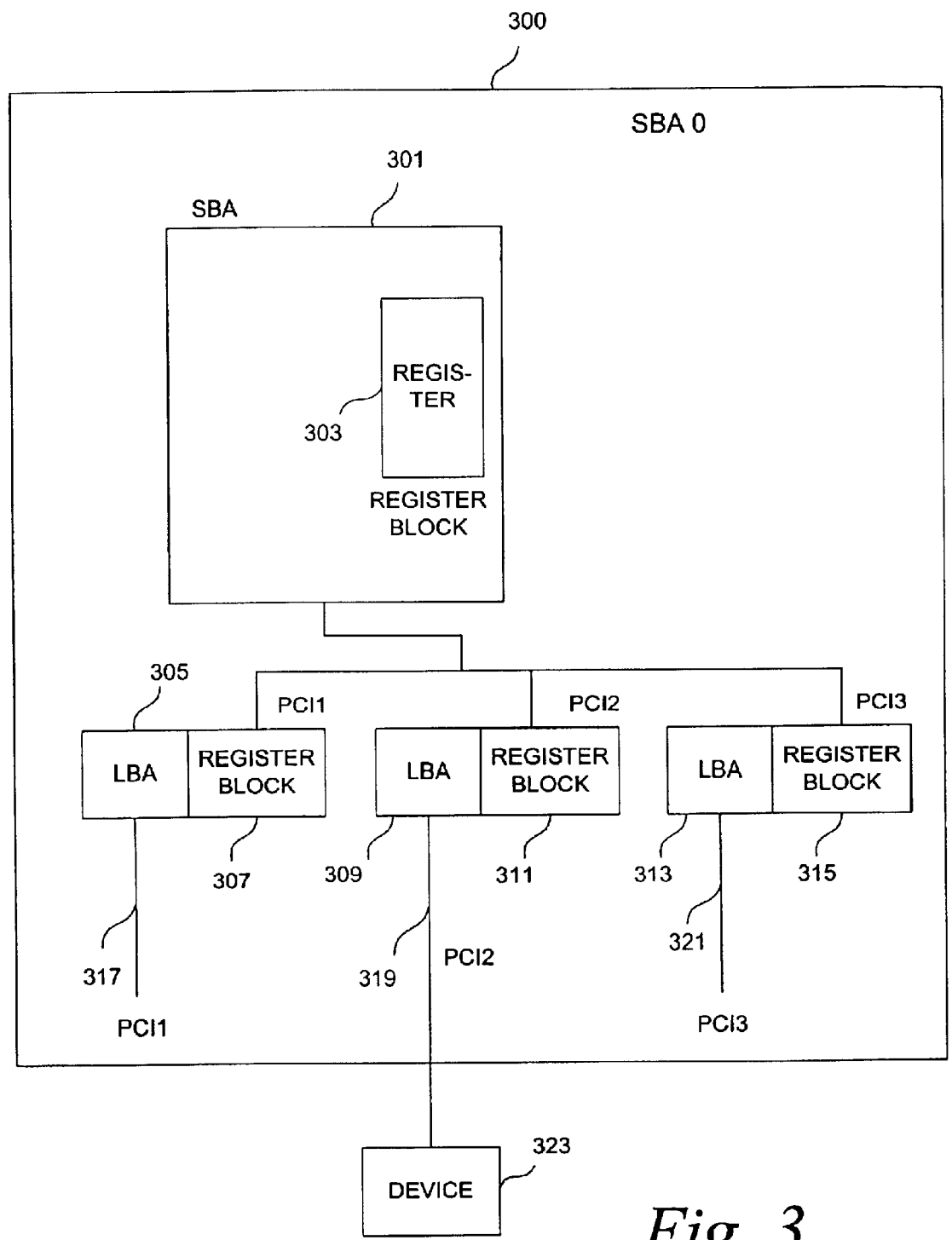
FIG. 3 is a block diagram of an exemplary system bus adapter, SBA0.

Referring now to FIG. 3, there is shown an exemplary system bus adapter SBA0 300. SBA0 300 has a system bus adapter SBA 301 with a chipset register 303. System bus adapter SBA 301 is connected to three local bus adapters (LBAs) 305, 309 and 313. The LBAs 305, 309 and 313 have register blocks 307, 311 and 315, respectively. Each LBA also has a PCI bus 317, 319 and 321. PCI bus 319 is connected to an external device 323.

Any given chipset will have an I/O controller (IOC). The chipset may also have a memory management controller (MMC). Aside from these controllers, the OS often interacts with something external. The chipset register does not have an internal register for these external devices. The chipset has its own registers to regulate some functions and also to regulate how it interacts with the external devices. In the technology of personal computers (PCs), IA-32 instruction set architecture is giving way to IA-64 instruction set architecture. In IA-32, the registers were typically mapped into a certain address region called I/O port space. A memory mapped I/O (MMIO) scheme can map an address into a firmware component, a physical addresses of the device, an ACPI device address, or an I/O port space. When the address is used, any response originates with the device to which the address is mapped.

If the OS is limited in understanding of the device that is consuming memory, then exposing it in the ACPI namespace might mislead the OS into thinking that a memory region is not being consumed when it really is. If the OS reassigns this region, then there will be a conflict. This scenario is true for the register map. MMIO is used to map the registers, as well as other memory areas.

When the ACPI resources are described, some are identified as producers and some as consumers. If a memory access is received by the chipset, the chipset must determine how to respond. The chipset may respond that it owns the memory range, and then pass along the data to a child resource that actually owns the address range. Thus, the chipset is the producer. A producer simply reflects a memory access to a child device. If that child device directly owns the memory being accessed, it is the consumer of the transaction. Referring again to FIG. 2, the system bus adapter _SBA0 226 knows about the address range used for its child PCI0 device 227. _SBA0 is a producer and likewise PCI0 is a producer of the address range. The PCI0 device 227 would respond to its address, as the consumer.

Figure 4:
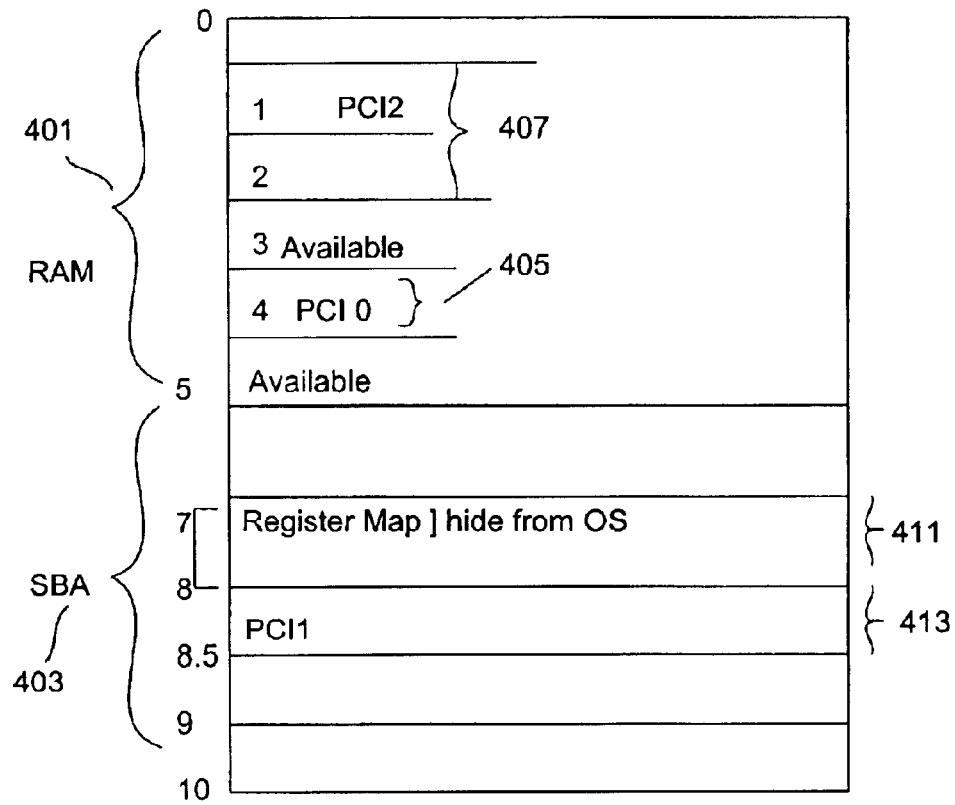
FIG. 4 shows an exemplary memory block used with MMIIO.

Referring now to FIG. 4, there is shown an exemplary memory block used with MMIO. In this exemplary MMIO, memory region 0-5, as indicated by reference numeral 401, is RAM. System bus adapter SBA has memory 5-9, as indicated by reference numeral 403. Thus, all transactions that go through addresses 5-9 are owned by SBA. Suppose that memory area 7 is the register map. The OS understands that 5-9 is actually memory that is mapped to devices, because, technically, SBA is a device. A new device is connected and needs a unit of memory. Without the present method, the OS sees the register map area (7) and sees it as an allocable section of memory. In the prior art, there was no way to indicate that this memory region has already been dedicated to another use. Therefore the OS could not see that a PCI bus needed to consume some of that memory, and so it was not available to other resources.

Systems of the prior art allocated regions of memory, as needed. For instance, suppose memory region 4 (405) is consumed by PCI0 and memory region 1-2 is consumed by PCI2 (407). Suppose a new device D is installed and memory region 1-5 appears as available. Regions 1-2 and 4-4 are used by PCI0 and PCI2. Device D needs one unit of memory. The OS looks at region 0-5 and determines that region 3-3 appears to be available. The OS will allocate region 3-3 for device D. If D needed two units, then the OS would have to re-map one of the other devices to create a contiguous region with two memory units.

In ACPI there are attributes to memory that indicate that it is being consumed, but legacy code written for IA-32 can only accommodate I/O port space and not MMIO. There is no standard way to put the register map into a MMIO construct. If more memory must be allocated to a child device, or resource, the parent takes control of the region and assigns it. The register map must be exposed to the tools and device drivers so that they are not forced to interact directly with the hardware. Thus, the driver application or tool must use ACPI to interact with hardware, or to get resources.

The present system and method takes advantage of the _CRS (current resource settings) data object of ACPI to hide the MMIO address information from the OS so that it will not reallocate memory regions in error. When a resource is required, the event requiring the resource returns the current resource settings in the _CRS data object. The _CRS object evaluates to a byte stream that describes the system resources currently allocated to a device. Additionally, a bus device must supply the resources that it decodes and can assign to its children devices.

For instance, using MMIO techniques of the present method, SBA uses memory region 7-8 for its PCI buses. Memory region 7-8 (411) must be hidden from the OS when it requests a _CRS so that it will not attempt to reallocate this region. When the OS needs to determine the current resources for SBA, the resource status _CRS data object will return 5-6 and 8-9. Region 7-8 is identified in a byte stream called vendor-long, instead of being exposed in the _CRS. The OS ignores the contents of this string, but passes it along to the original requester or device driver, when appropriate. Thus, the OS sees memory regions 0-6 and 8-10 but not 7-8. Memory location 7 remains hidden. The OS knows that 0-5 is RAM and 5-6 and 8-9 are owned by SBA.

Figure 5:
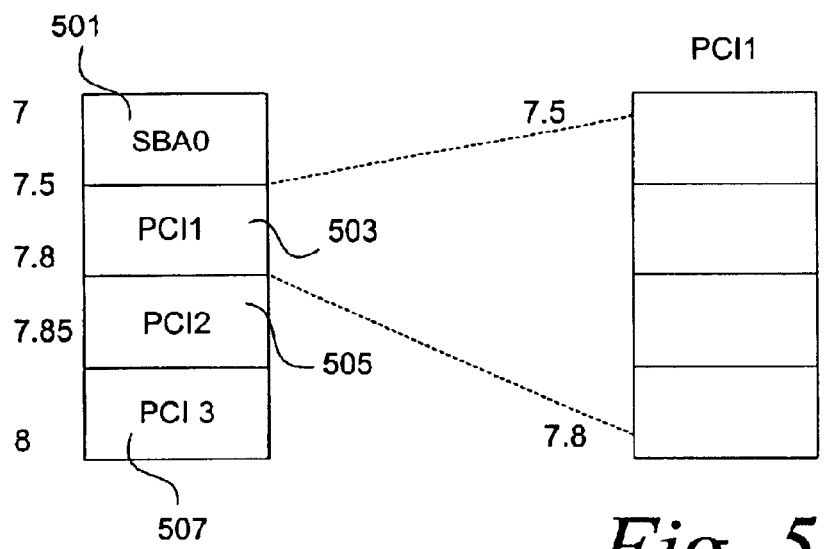
FIG. 5 shows an expansion of the memory space of FIG. 4, at region 7.

The PCI bus can also return a status. FIG. 5 shows an expansion of the memory space at region 7-8. The register map for SBA0 is 7 to 7.5 (reference 501). PCI1 owns 7.5 to 7.8 (reference 503). PCI2 owns 7.8 to 7.85 (reference 505). PCI3 owns 7.85 to 8 (reference 507). However, when the _CRS data is returned from a query about the SBA resources, the memory area for region 7-8 is returned only in the vendor-long byte stream. Since ACPI ignores this data, this memory area is effectively hidden.

Suppose that the OS requests the current resources for PCI1. PCI1 owns the memory map from 7.5 to 7.8. PCI1 also will have a memory in the normal map, as well as the hidden register map. For instance, in this example it has memory 8 to 8.5 (FIG. 4, reference 413). When the _CRS data is returned for a query about the PCI1 resources, the OS will see only 8 to 8.5 and the 7.5 to 7.8 region will remain hidden. This hidden information is sent in the vendor-long byte stream and is used only by tools that are developed to understand this object.

One goal is to prevent the OS from giving another PCI device or another add-in device the register memory that is already owned. This is necessary for items like local bus adapters or other devices that are not visible to the customer/user. They are OS visible, but not customer visible. It may also be desirable to tweak the performance of a device driver for a video card, a network card, or other device. This can be done by tweaking register settings. A driver that knows it has access to the hidden chipset register addresses can modify settings in the chipset. For instance, a certain network card might perform better underneath a certain bus.

In contrast, in systems of the prior art, a driver could not be made optimal because the register addresses were exposed to potential misuse. If the register maps of the prior art were exposed to the OS, they could automatically get consumed by mistake by the OS for some other function.

For example, the register map maps into a PCI device. When the system processor accesses an address, the address comes through the chipset. When the address comes through the chipset, it is identified as being owned by the PCI device. The ACPI tools could not access the register based on the information returned in the _CRS, because of the hidden register map. Thus, the vendor-long descriptor (0×4) is used to pass the appropriate memory address information to the tools or device drivers which need it. Thus, when an OS or other application looks at that region of memory, all that is seen is the first part (_CRS data object) and the OS literally just ignore anything that's marked as vendor long.

The vendor-long byte stream is now defined for MMIO use as follows. One byte indicated the resource type. Another byte indicates the start of the resource type data stream and a third byte indicates the end of the data stream for that resource. For instance, the first two bytes are the start address or size of the address. The last address is the ending address. It will be apparent to one skilled in the art that various formats can be defined. In this way, the vendor-long data object can now pass useful information to tools needing access to devices and resources.

An example template for a vendor long is shown below for illustrative purposes.

```
VendorLong (CCSR)
{
    0x02, // GUID Specific Desc sub type
    0xf9, // GUID
    0xad,
    0xe9,
    0x69,
    0x4f,
    0x92,
    0x5f,
    0xab,
    0xf6,
    0x4a,
    0x24,
```

```
                    -continued

0xd2,
    0x01,
    0x37,
    0x0e,
    0xad,
    0x00, // CEC CSR Base Address
    0x00,
    0x00,
    0x00,
    0x00,
    0x00,
    0x00,
    0x00,
    0x00, // CEC CSR Range Length
    0x00,
    0x00,
    0x00,
    0x00,
    0x00,
    0x00,
    0x00,
    } // VendorLong CCSR
```

Having described preferred embodiments of a novel method to for populating and using an existing ACPI variable with MMIO information, (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. A mechanism for hiding memory from an operating system, where the memory is owned by a device and is allocated using memory mapped I/O (MMIO), comprising:
   a computer system connected to a plurality of devices, wherein an operating system interacts with the plurality of devices using Advanced Configuration and Power Interface (ACPI);
   a memory block connected to the computer system, wherein the memory block is allocated to the plurality of devices to provide an MMIO register map for device interaction; and
   means for hiding regions of memory from the operating system, the hidden memory being allocated to at least one of the plurality of devices, wherein the hidden memory is accessible to at least one tool, the tool interacting with at least one of the devices having allocated hidden memory.

2. The mechanism as recited in claim 1, wherein the tool is a device driver.

3. The mechanism as recited in claim 1, wherein means for hiding regions of memory uses a variable length ACPI data object to pass information regarding the hidden memory, wherein the operating system ignores the information passed in the variable length ACPI data object.

4. The mechanism as recited in claim 3, wherein variable length ACPI data object is a previously defined ACPI vendor-long data object.

5. The mechanism as recited in claim 4, wherein the computer system uses IA-64 instruction set architecture.

6. A method of using memory mapped I/O (MMIO) to manage system devices, comprising:
   allocating memory in a computer system to a plurality of devices, the memory corresponding to a register map of the plurality of devices;
   identifying areas of allocated memory that should be hidden from the operating system, the hidden areas being accessible by at least one tool interacting with at least one of the plurality of devices; and
   enabling an operating system running on the computer system to view selected memory allocations of MMIO, the operating system ignoring the hidden areas of allocated memory.

7. The method as recited in claim 6, wherein enabling an operating system to view selected memory allocations, comprises:
   receiving a current status data object of a resource, wherein the current status returns information corresponding to memory allocations of devices and resources available to the operating system; and
   receiving a vendor-long data object of a resource, wherein the vendor-long returns information corresponding to memory allocations of devices and resources hidden form the operating system.

8. The method as recited in claim 7, further comprising passing the vendor-long data to a tool, by the operating system, wherein the tool utilizes the hidden memory allocation information.

9. The method as recited in claim 8, wherein the tool is a device driver.

10. The method as recited in claim 6, wherein the computer system uses IA-64 instruction set architecture.

11. A computing device using memory mapped I/O (MMIO) for hiding selected regions of mapped memory from an operating system, comprising:
   a central processing unit (CPU) having memory;
   a memory bus connecting the CPU with a plurality of devices, wherein the memory bus comprises data, address and control information, wherein an operating system interacts with the plurality of devices using Advanced Configuration and Power Interface (ACPI);
   a memory block connected to the CPU, wherein the memory block is allocated to the plurality of devices to provide an MMIO register map for device interaction; and
   means for hiding regions of memory from the operating system, the hidden memory being allocated to at least one of the plurality of devices, wherein the hidden memory is accessible to at least one tool, the tool interacting with at least one of the devices having allocated hidden memory.

12. The computing device as recited in claim 11, wherein the tool is a device driver.

13. The computing device as recited in claim 11, wherein means for hiding regions of memory uses a variable length ACPI data object to pass information regarding the hidden memory, wherein the operating system ignores the information passed in the variable length ACPI data object.

14. The computing device as recited in claim 13, wherein variable length ACPI data object is a previously defined ACPI vendor-long data object.

15. The computing device as recited in claim 14, wherein the computing device uses IA-64 instruction set architecture.

16. The computing device as recited in claim 15, wherein the computing device is a personal computer (PC).

* * * * *